(12) United States Patent
Kobayashi (10) Patent No.: US 7,460,887 B2
(45) Date of Patent: Dec. 2, 2008

(54) PORTABLE FOLDING COMMUNICATION UNIT

(75) Inventor: Takeshi Kobayashi, Tokyo (JP)

(73) Assignee: NEC Corporation (JP)

( * ) Notice: Subject to any disclaimer, the term of this patent is extended or adjusted under 35 U.S.C. 154(b) by 518 days.

(21) Appl. No.: 09/853,426

(22) Filed: May 10, 2001

(65) Prior Publication Data

US 2001/0044319 A1    Nov. 22, 2001

(30) Foreign Application Priority Data

May 17, 2000    (JP)    ............................. 2000-145407

(51) Int. Cl.
*H04B 1/38*    (2006.01)
*H04M 1/00*    (2006.01)

(52) U.S. Cl. ................. 455/566; 455/575.1; 455/575.3; 455/567; 455/569.1; 455/90.3; 379/433.01; 379/433.04; 379/433.07; 379/433.1; 379/433.13

(58) Field of Classification Search .............. 455/575.1, 455/575.3, 90.1–3, 556.1–2, 566–567, 557, 455/569.1–2, 550.1, 3; 379/433.01–7, 433.11–13, 379/433.1; 345/156, 158, 168, 169, 204, 345/205, 206, 214

See application file for complete search history.

(56) References Cited

U.S. PATENT DOCUMENTS

| | | | | |
|---|---|---|---|---|
| 5,584,054 | A * | 12/1996 | Tyneski et al. ............... | 455/566 |
| 6,002,946 | A * | 12/1999 | Reber et al. .................. | 455/557 |
| 6,144,358 | A * | 11/2000 | Narayanaswamy et al. | 345/102 |
| 6,230,028 | B1 * | 5/2001 | Shirakawa ................... | 455/566 |
| 6,304,763 | B1 * | 10/2001 | Jahagirdar et al. ........... | 455/566 |
| 6,389,267 | B1 * | 5/2002 | Imai ........................... | 455/90.1 |
| 6,418,325 | B1 * | 7/2002 | Reber et al. ............... | 455/556.1 |
| 6,434,404 | B1 * | 8/2002 | Claxton et al. ........... | 455/575.3 |
| 6,445,932 | B1 * | 9/2002 | Soini et al. ................ | 455/556.1 |
| 6,466,202 | B1 * | 10/2002 | Suso et al. .................. | 345/169 |
| 6,526,296 | B1 * | 2/2003 | Nieminen ................ | 455/575.3 |
| 6,529,747 | B1 * | 3/2003 | Toba .......................... | 455/563 |

(Continued)

FOREIGN PATENT DOCUMENTS

CN    1202079 A    12/1998

(Continued)

OTHER PUBLICATIONS

Japanese Office Action issued on Dec. 3, 2002 (w/ English translation of relevant portion).

(Continued)

*Primary Examiner*—Tuan A Tran
(74) *Attorney, Agent, or Firm*—Dickstein, Shapiro, LLP.

(57) ABSTRACT

A folding portable communication unit is composed an upper cabinet, a lower cabinet, and a hinge for so supporting the upper and lower cabinets that they are rotational around the hinge. A simplified LCD and a simplified key unit are provided for a rear cover of the upper cabinet or the lower cabinet, and thereby a user can watch the simplified LCD or operate the simplified key unit, even when the upper and lower cabinets are folded. Information is displayed on either of a LCD or the simplified LCD depending on whether the upper and lower cabinets are folded or not and on the kind of information to be displayed.

8 Claims, 5 Drawing Sheets

U.S. PATENT DOCUMENTS 6,807,275 B1 * 10/2004 Kubo et al. ............ 379/433.04

FOREIGN PATENT DOCUMENTS

| CN | 1295421 A | 5/2001 |
|---|---|---|
| EP | 0 776 140 | 5/1997 |
| EP | 0 903 659 | 3/1999 |
| EP | 0 962 852 | 12/1999 |
| EP | 0 963 090 | 12/1999 |
| GB | 2 343 324 * | 3/2000 |
| GB | 2 343 324 | 5/2000 |
| JP | 9-181801 | 7/1997 |
| JP | 2001-136251 | 5/2001 |

OTHER PUBLICATIONS

Chinese Office Action dated Oct. 31, 2003 (English translation of relevant portion).

* cited by examiner

FIG. 1A  RRIOR ART

FIG. 1B  RRIOR ART

52a, 52b : LED

FIG. 6B

56a TO 56h : LED

FIG. 7

PORTABLE FOLDING COMMUNICATION UNIT

FIELD OF THE INVENTION

The invention related to a folding portable commutation unit which can be folded if a user needs, and handy to carry.

BACKGROUND OF THE INVENTION

Recently, a portable communication unit, such as a mobile telephone, has function of a data terminal for furnishing various informations as well as that of a telephonic communication though a voice, and is spread throughout the world during the past few years. The portable communication unit affords full facilities for transmitting and receiving information because of its excellent portability, which is an extremely important factor of this instrument. In the portable communication unit, since it is indispensable to have function of communication through the voice, a sound-sensing device, such as a microphone, should be situated close by the mouth, and a sound-generating device, such as a speaker, should be situated close by the ear. Accordingly, the length of an external shape of the portable communication unit must be nearly the same as an interval between the mouth and the ear, so that it becomes considerably large.

Figure 1A:
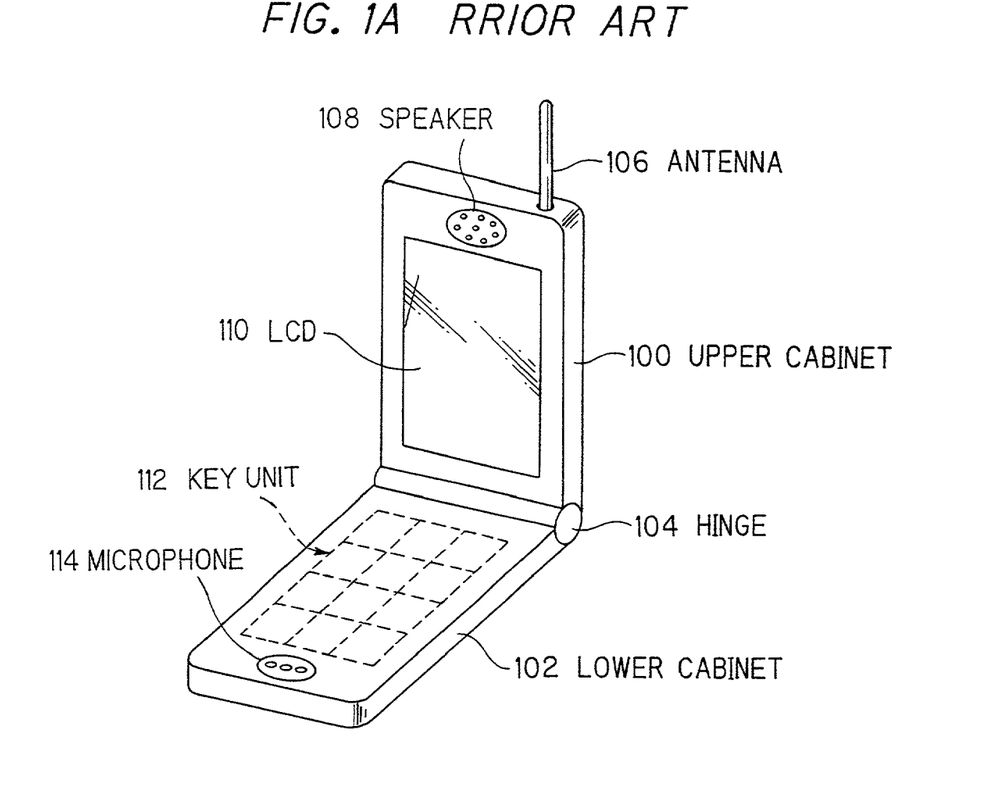
FIG. 1A is a perspective view for showing a state that the upper and lower cabinets are opened.
Figure 1B:
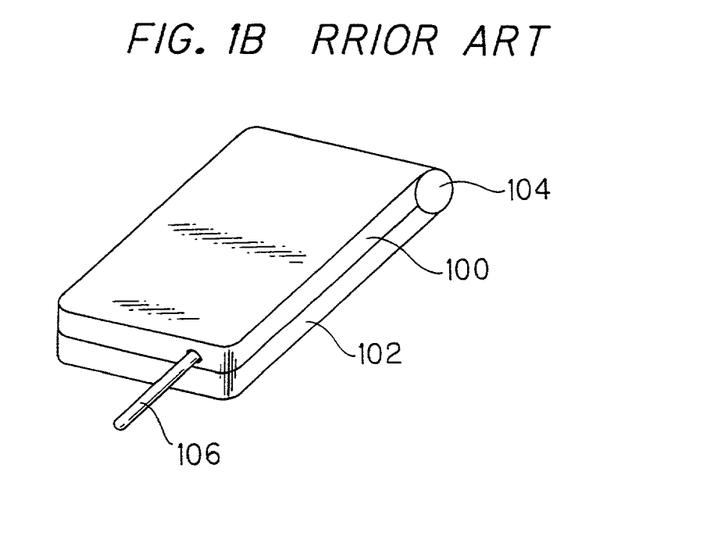
FIG. 1B is a perspective view for showing a state that the upper and lower cabinets are closed.

Form this point of view, a fording portable communication unit shown in FIGS. 1A, 1B has been devised heretofore. FIGS. 1A, 1B are perspective views for showing an external shape of a conventional folding portable communication unit. FIG. 1A shows a state that cabinets of the folding portable communication unit are opened, and FIG. 1B shows a state that the cabinets thereof are closed. As shown in FIGS. 1A, 1B, the conventional folding potable communication unit is composed of an upper cabinet 100, a lower cabinet 102, and a hinge 104 for so supporting the upper and lower cabinets 100, 102 that they are rotational around the hinge 104 in broad outline.

The upper cabinet 100 is provided with an antenna 106 for transmitting and receiving electric waves, a speaker 108 for converting aural information received by the antenna 106 into a voice and indicating it to a user, and a liquid crystal display (LCD, hereinafter) 110 for displaying various informations. The lower cabinet 102 is provided with a key unit 112 for inputting a data to be transmitted from the user in accordance with his operation, and a microphone 114 for converting a voice of the user into an audio signal. In case that the user uses the folding portable communication unit, he opens the upper and lower cabinets 100, 102 as shown in FIG. 1A, and operates the key unit 112 or speaks over the folding portable communication unit. When he does not use the folding portable communication unit and brings it with him, the upper and lower cabinets 100, 102 are closed as shown in FIG. 1B.

However, in the conventional folding portable communication unit, the single LCD 110 for displaying various informations and the single key unit 112 for inputting the data to be transmitted from the user are respectively provided, and the LCD 110 and the key unit 112 are exposed only when the upper and lower cabinets 100, 102 are opened. Accordingly, when the upper and lower cabinets 100, 102 are closed, the user can neither watch the LCD 110 nor operate the key unit 112.

In recent years, the portable communication unit has come to be used not only as means for transmitting and receiving voice information but also as a data terminal for furnishing the various data, and function as the data terminal is given much weight. Accordingly, it is expected in general that the portable communication unit in future will be required to be compact, light weight, easy to see the LCD and highly operable. However, if the portable communication unit becomes too small by regarding compactness and lightness as important excessively, the surface area of the whole portable communication unit is reduced, and the man machine interface, such as the LCD or the key unit, becomes too small, so that the portable communication unit becomes hard to operate. The aforementioned arguments hold in the case of the folding portable communication unit also.

SYMMARY OF THE INVENTION

Accordingly, it is an object of the invention to provide a folding portable communication unit which secures compactness, lightness, visibility of a LCD, and improved operability.

According to the first feature of the invention, a folding portable communication unit which is composed of the first and second cabinets and a hinge for so supporting the first and second cabinets that they are rotational around the hinge, comprises:

display/data-input means which displays information related to communication, inputs data related to the communication, and is situated on a rear cover of the first or second cabinet, wherein the information can be watched and the data can be inputted by a user in case that the first and second cabinets are folded.

According to the second feature of the invention, a folding portable communication unit which is composed of the first and second cabinets and a hinge for so supporting the first and second cabinets that they are rotational around the hinge, comprises:

the first display/data-input means which displays the first information related to communication, inputs the first data related to the communication, and is situated on an obverse surface of the first and second cabinets, and the second display/data-input means which displays the second information related to the communication, inputs the second data related to the communication, and is situated on a rear cover of the first or second cabinet, wherein the second information can be watched and the second data can be inputted by a user in case that the first and second cabinets are folded.

In the folding portable communication unit according to Claim 3, the first and second cabinets include controlling functions, and are provided with control means which decides whether input information is to be displayed on the first or second display/data-input means depending on a kind of the input information.

In the folding portable communication unit according to Claim 4, the control means is further provided with means for detecting whether the first and second cabinets are folded or not, and decides whether the input information is to be displayed on the first or second display/data-input means depending on a result of detection performed by the detecting means.

In the folding portable communication unit according to Claim 5, the control means displays the input information on the second display/data-input means, when it is detected that the first and second cabinets are folded.

In the folding portable communication unit according to Claim 6, the input information is displayed on the first display/data-input means in case that the input information is pictorial information.

In the folding portable communication unit according to Claim 7, the control means further comprises means for displaying the input information on the second display/data-input means in accordance with of instruction of the user.

BRIEF DESCRIPTIOIN OF THE DRAWINGS

The invention will be explained in more detail in conjunction with appended drawings, wherein;

FIGS. 1A, 1B show a conventional folding portable folding portable communication unit, wherein FIGS. 2A, 2B show a folding portable communication unit according to a preferred embodiment of the invention, wherein FIGS. 6A, 6B show structures of a LCD and a simplified LCD, wherein FIG. 6A shows a structure of a simplified LCD, and FIG. 6B shows a structure of a LCD.

DISCRIPTION OF THE PREFERRED EMBODIMENT

Figure 2A:
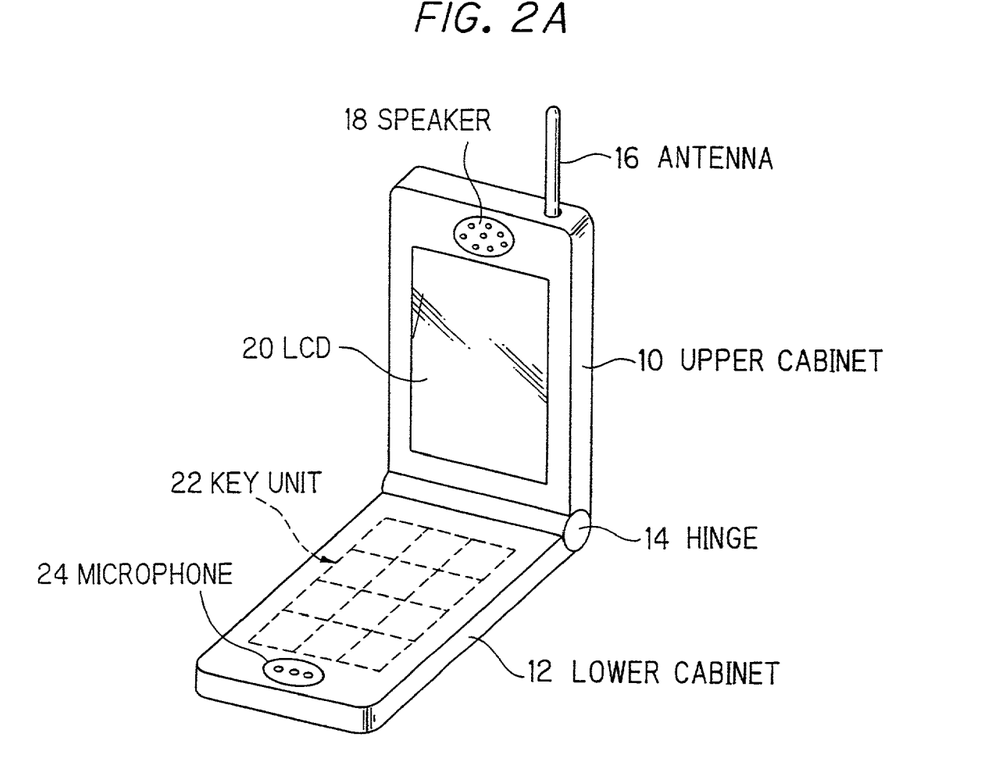
FIG. 2A is a perspective view for showing a state that the upper and lower cabinets are opened.
Figure 2B:
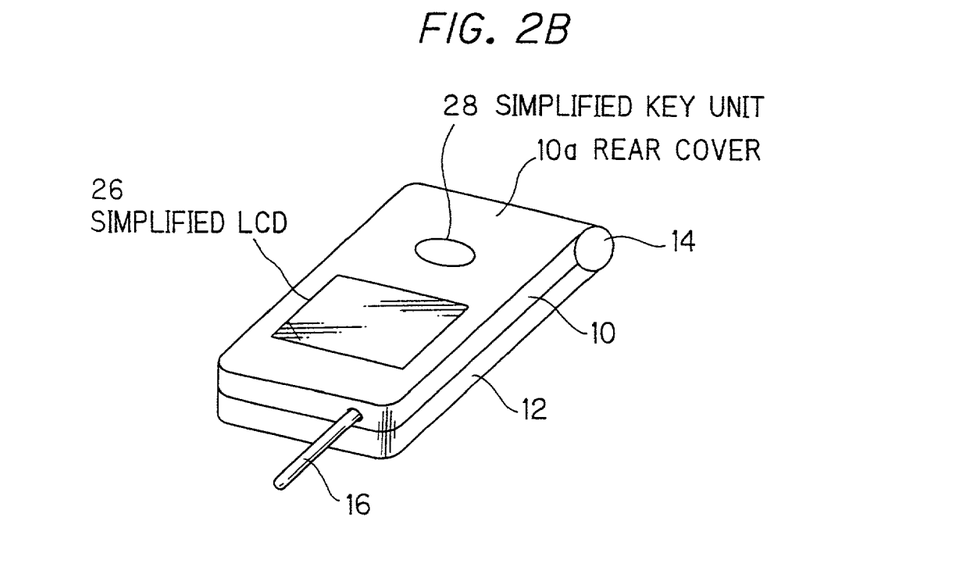
FIG. 2B is a perspective view for showing a state that the upper and lower cabinets are closed.

Hereafter, a folding portable communication unit according to a preferred embodiment of the invention will be explained in detail referring to the appended drawings. FIGS. 2A, 2B show external shapes of a folding portable communication unit according to a preferred embodiment of the invention. FIG. 2A is a perspective view for showing a state that the upper and lower cabinets thereof are opened, and FIG. 2B is a perspective view for showing a state that the upper and lower cabinets thereof are closed. The folding portable communication unit shown in FIGS. 2A, 2B, is composed of an upper cabinet 10 and a lower cabinet 12, and a hinge 14 for so supporting the upper and lower cabinets 10, 12, that they are rotational around the hinge 14 in broad outline.

The upper cabinet 10 is provided with an antenna 16 for transmitting and receiving electric waves, a speaker 18 for converting aural information received by the antenna 16 into a voice and indicating it to a user, and a LCD 20 for displaying various imformations. Moreover, the lower cabinet 12 is provided with a key unit 22 for inputting data to be transmitted from the user in accordance with his operation, and a microphone 24 for converting a voice of the user into an audio signal. The aforementioned structure is similar to that of the conventional folding portable communication unit shown in FIGS. 1A, 1B.

A feature of the folding portable communication unit according to the preferred embodiment of the invention is that it is provided with a simplified LCD 26 and a simplified key unit 28, each being situated on a rear cover 10a of the upper cabinet 10, in addition to the structure shown in FIG. 2A. That is to say, according to the conventional folding portable communication unit shown in FIGS. 1A, 1B, although the user can confirm characters etc. displayed on the LCD 110 in case that the upper and lower cabinets 100, 102 are opened, he can neither confirm information displayed on the LCD 110 nor operate the key unit 112 in case that the upper and lower cabinets 100, 102 are closed.

Since the folding portable communication unit according to the preferred embodiment is provided with the simplified LCD 26 and the simplified key unit 28 situated on the rear cover 10a of the upper cabinet 10 in addition to the LCD 20 and the key unit 22, the user can select either of the two LCDs and either of the two key units depending on the existing conditions. Accordingly, operability of the folding portable communication unit can be improved, and electric power consumed therein can be saved. That is to say, when the upper and lower cabinets 10, 12 are opened, various informations are displayed on the LCD 20, and the user can input the data to be transmitted through the key unit 22. On the other hand, when the upper and lower cabinets 10,12 are closed, various informations are displayed on the simplified LCD 26, and the data to be transmitted from the user is inputted through the simplified key unit 28. Electric power consumed in the LDCs 20, 26 or light-emitting diodes (LEDs, hereinafter) serving as illuminating functions, such as back lights, can be saved by selectively using the LCD 20 together with the key unit 22 and the simplified LCD 26 together with the simplified key unit 28 depending on the existing conditions. Since the simplified LCD 26 is situated on the rear cover 10a of the upper cabinet 10, a displaying area of the simplified LCD 26 is smaller than that of the LCD 20.

Figure 3:
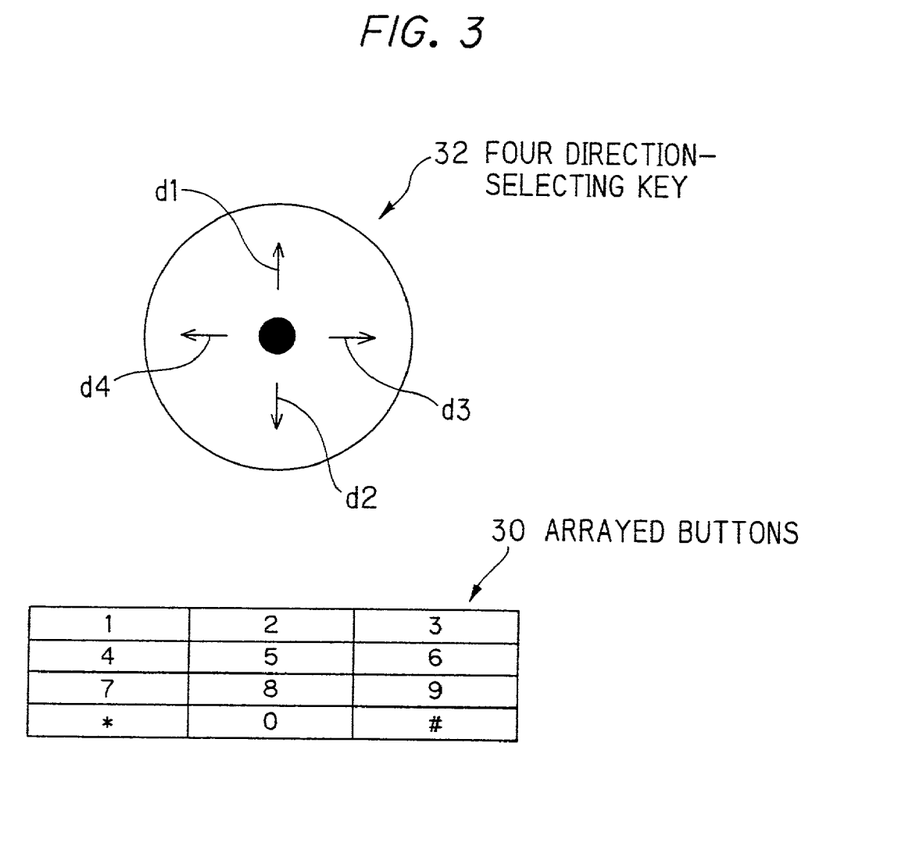
FIG. 3 shows a structure of a simplified key unit used in a folding portable communication unit according to a preferred embodiment of the invention.

FIG. 3 shows an example of a structure of the simplified key unit 28 used in the folding portable communication unit according to the preferred embodiment of the invention. As shown in FIG. 3, the simplified key unit 28 is provided with arrayed buttons 30 which are composed of the buttons printed with numerals, symbols, etc. and a four direction-selecting key 32 which is pressed by the user in directions denoted by d1, d2, d3, d4, where de, d2, d3, and d4 respectively correspond to upward, downward, rightward and leftward directions. Accordingly, the user presses the arrayed buttons 30 and the four direction-selecting key 32, and thereby inputs desired information.

Figure 4:
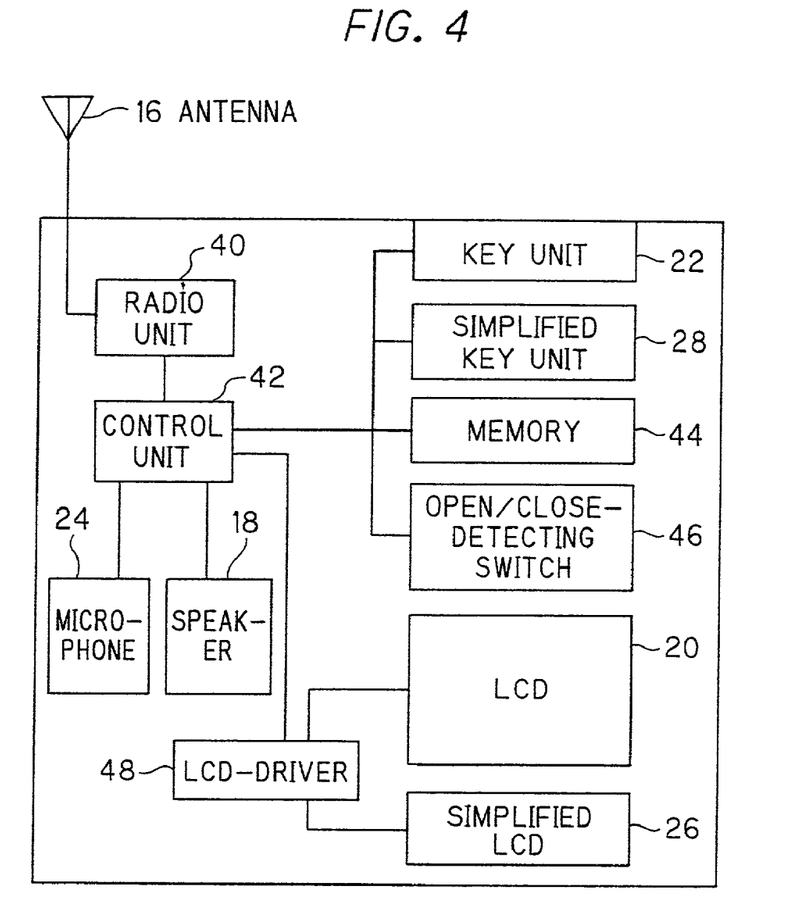
FIG. 4 is a block diagram for showing an electrical configuration of a folding portable communication unit according to a preferred embodiment of the invention.

Next, an electrical configuration of the folding portable communication unit according to the preferred embodiment of the invention will be explained. FIG. 4 is a block diagram for showing the electrical configuration of the folding portable communication unit according to the preferred embodiment of the invention. Structural elements having the same functions are represented by the same reference numerals throughout FIG. 4 and FIGS. 2A, 2B. As shown in FIG. 4, the electrical configuration of the folding portable communication unit is composed of an antenna 16, a radio unit 40, a control unit 42, a microphone 24, a speaker 18, a key unit 22, a simplified key-unit 28, a memory 44, an open/closed-detecting switch 46, a LCD-driver 48, a LCD 20, and a simplified LCD 26.

The antenna 16 transmits and receives the electric waves, and a radio signal received by the antenna 16 is supplied to the radio unit 40. When the radio signal received by the antenna 16 is aural information, the radio unit 40 converts the radio signal unto the audio signal, and supplies it to the control unit 42. The control unit 42 outputs the audio signal supplied from the radio unit 40 to the speaker 18, and the speaker 18 converts the audio signal into a voice. Moreover, if an audio signal is inputted to the control unit 42 from the microphone 24, the audio signal is supplied to the radio unit 40 via the control unit 42, converted into aural information therein, and transmitted from the antenna 16 as the radio signal.

Moreover, the control unit 42 conducts various controls in accordance with operational information inputted from the key unit 22 or the simplified key unit 28. The memory 44 is composed of a random access memory (RAM) and a read only memory (ROM), and stores a program for controlling operation of the folding portable communication unit or character information received by the antenna 16 temporarily. The open/close-detecting switch 46 detects whether the upper and lower cabinets 10, 12 shown in FIG. 2A are opened or closed. The LCD-driver 48 controls displays of the LCD 20 and the simplified LCD 28. The control unit 42 makes the LCD-driver 48 decide which display is to be used the LCD 20 or the simplified LCD 26 depending on the output signal of the open/close-detecting switch 46 and on the kind of information to be displayed.

Figure 5:
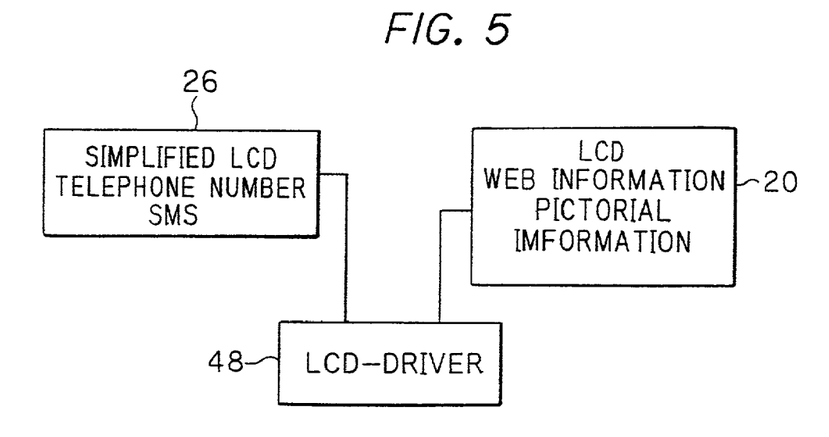
FIG. 5 is a block diagram for showing a structure for selecting the display in accordance with the kind of information to be displayed.

Herein, control for selecting the display in accordance with the kind of information to be displayed will be explained referring to FIG. 5. FIG. 5 is a block diagram for explaining control for selecting the display in accordance with the kind of information to be displayed. As mentioned in the above, since the area of the simplified LCD 26 is smaller than that of the LCD 20, the LCD-driver 48 makes the simplified LCD 20 display simple information, such as a telephone number or a short message (SMS). On the other hand, WEB information or pictorial information is displayed on the LCD 20 having a wide area. However, the aforementioned control for selecting the display is only an exemplification, and the display may be selected in accordance with the output signal of the open/close-detecting switch 46. For example, when the upper and lower cabinets 10, 12 are closed, the data inputted through the simplified key unit 28 is displayed on the simplified LCD 26; and when the upper and lower cabinets 10, 12 are opened, the data inputted through the key unit 22 is displayed on the LCD 20. The method mentioned in the above is desirable because facility for usage increases.

Figures 6A, 6B:
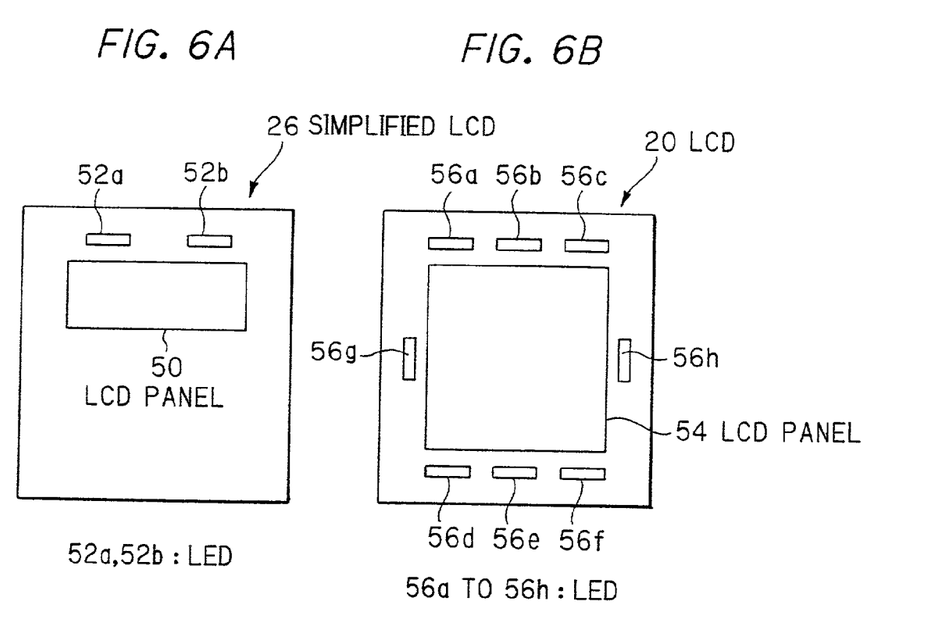

Next, explanations will be given to the LCD 20 and the simplified LCD 26 referring to FIGS. 6A, 6B. FIG. 6A shows a structure of the simplified LCD 26, and FIG. 6B shows a structure of the LCD 20. As shown in FIG. 6A, the simplified LCD 26 is provided with a LCD panel 50 having a small surface area, and the LCD panel 50 is provided with two LEDs 52a, 52b serving as back lights thereof. On the other hand, the LCD 20 shown in FIG. 6B is provided with a LCD panel 54 having a large surface area, and the LDC panel 54 is provided with eight LEDs 56a to 56h serving as back lights thereof. For example, when the upper and lower cabinets 10, 12 are closed, the desired data can be obtained without opening the upper and lower cabinets 10, 12 by displaying information on the simplified LCD 26. Accordingly, operation of the folding portable communication unit can be simplified, facility for usage increases, and consumed electric power can be saved.

Figure 7:
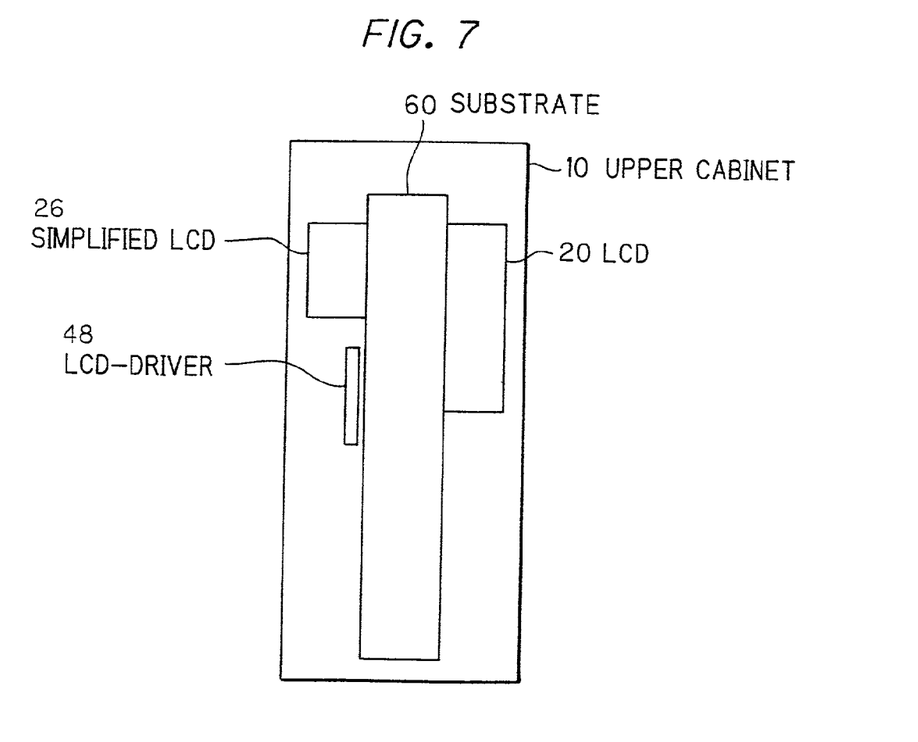
FIG. 7 shows cross-sectional views of a LCD and a simplified LCD, each being mounted on a substrate, shown in a plane vertical to a rotational axis of a hinge.

Next, the states of the LCD 20 and the simplified LCD 26 mounted on the folding portable communication unit will be explained. FIG. 7 is a cross-sectional view of both the LCD 20 and the simplified LCD 26 shown in a plane which cuts the upper cabinet 10 vertically to the hinge 14. In FIG. 7, the structural elements which are not related to the explanations are omitted. As shown in FIG. 7, the LCD 20, the simplified LCD 26 and the LCD-driver 48 are respectively mounted on a substrate 60 formed of PCB, where the LCD 20 is mounted on the obverse surface of the substrate 60, and the simplified LCD 26 and the LCD-driver 48 are mounted on the reverse surface of the substrate 60. Since the simplified LCD 26 and the LCD-driver 48, each having a small surface area, are mounted on the reverse surface of the substrate 60, and the LCD 20 having the large surface area is mounted on the obverse surface of the substrate 60, both the a surface area of the substrate 60 can be utilized uniformly, and uselessness is reduced.

As mentioned in the above, when the upper and lower cabinets 10, 12 are opened in the folding portable communication unit, the open/close-detecting switch 46 detects that both the cabinets 10, 12 are opened, and the control unit 42 controls the LCD-driver 48 so that information is displayed on the LCD 20. When the upper and lower cabinets 10, 12 are closed, the open/close-detecting switch 46 detects that both the cabinets are closed, and the control unit 42 controls the LCD-driver 48 so that information is displayed on the simplified LCD 26.

Although explanations are given to the folding portable communication unit according to the preferred embodiment of the invention in the above descriptions, the applications of the invention are never restricted to the aforementioned embodiment, and several modifications and improvements of the embodiment can be devised in a scope of the invention. For example, although the LCD 20 and the key unit 22 are separated from each other in the aforementioned embodiment, a new LCD may be provided for the lower cabinet 12 by unifying the LCD 20 and the key unit 22 to form a LCD of a touch panel type, which is situated on the position of the LCD 20 shown in FIG. 2A. Since the areas for displaying information can be increased according to the aforementioned devices, a new effect that more informations can be displayed by effectively using the surface areas of the folding portable communication unit can be achieved. The similar effect can be achieved for the simplified key unit 28. Moreover, although the LCD 20, the simplified LCD 26 and the simplified key unit 28 are provided for the upper cabinet 10 for convenience of mounting in the aforementioned embodiment, the simplified LCD 26 and the simplified key unit 28 may be provided for the rear cover of the lower cabinet 12. Still more, whether information is displayed on the LCD 20 or on the simplified LCD 26 may be decided in accordance with instruction of the user.

As mentioned in the above, since the display/data-input means is situated on the rear cover of the first or second cabinet, a user can watch the display and input the date even in case that the upper and lower cabinets are folded.

Since the first display/date-input means is situated on the obverse surface of the first and second cabinets, the second display/data-input means is situated on the rear cover of the first or second cabinet, and information can be displayed on either of the first or second display/data-input means depending on whether first and second cabinets are folded or not and on the kind of information, the folding portable communication unit can be operated in various ways and facility for usage highly increases. Especially in case that the surface area of the first display/data-input means is larger than that of the second display/data-input means and the first and second cabinets are folded, consumed electric power can be saved by displaying information on the second display/data-input means. Moreover, when pictorial information is displayed, visibility of information can be heightened by displaying information on the first display/data-input means.

What is claimed is:
1. A folding portable communication unit, comprising:
   a first cabinet;
   a second cabinet, the first cabinet and the second cabinet being supported by a hinge so as to be rotatable around the hinge;

a first key unit situated on an obverse surface of the first cabinet or the second cabinet and from which a user inputs first data;

a second key unit situated on a rear cover of the first or second cabinet and from which the user inputs second data in a case that the first cabinet and the second cabinet are folded in a closed position;

a first display situated on an obverse surface of the first cabinet and which displays first information;

a second display, smaller than the display, situated on a rear surface of the first cabinet or the second cabinet and which displays second information, the second information being viewable by the user in a case that the first cabinet and the second cabinet are folded in the closed position;

a common display driver operable to drive both the first display and the second display, the second display and the common display driver being mounted on one side of a substrate and the first display being mounted on the other side of the substrate; and a control unit operable to make the common display driver decide which of the first display and the second display is to be used, wherein the folding portable communication unit is operable to permit verbal telephone communication only in a case that the first cabinet and the second cabinet are in an open position.

2. The folding portable communication unit according to claim 1, wherein:

the control unit is operable to make the common display driver display the first data inputted from the first key on the first display in a case that the first cabinet and the second cabinet are in the open position, and to make the common display driver the second data inputted from the second key on the second display in a case that the first cabinet and the second cabinet are in the closed position.

3. The folding portable communication unit according to claim 1, wherein:

the control unit is operable to make the common display driver decide which of the first display and the second display to display input information depending on a kind of the input information.

4. The folding portable communication unit according to claim 3, wherein:

the input information is displayed on the first display in case that the input information is pictorial information.

5. The folding portable communication unit according to claim 1, wherein:

the control unit comprises a means for detecting whether or not the first cabinet and the second cabinet are folded, and is operable to decide on which of the first display and the second display to display input information, depending on a result of detection performed by the detecting means.

6. The folding portable communication unit according to claim 1, wherein:

the control unit is operable to display input information on the second display when it is detected that the first cabinet and the second cabinet are folded.

7. The folding portable communication unit according to claim 1, wherein the first and second displays are provided on the rear surface and the obverse surface of the same cabinet.

8. A folding portable communication unit, comprising:

a first cabinet;

a second cabinet, the first cabinet and the second cabinet being supported by a hinge so as to be rotatable around the hinge;

a first key unit situated on an obverse surface of the first cabinet or the second cabinet and from which a user inputs first data;

a second key unit situated on a rear cover of the first or second cabinet and from which the user inputs second data in a case that the first cabinet and the second cabinet are folded in a closed position;

a first display situated on an obverse surface of the first cabinet and which displays first information;

a second display situated on a rear surface of the first cabinet or the second cabinet and which displays second information, the second information being viewable by the user in a case that the first cabinet and the second cabinet are folded in the close position;

a common display driver operable to drive both the first display and the second display; and a control unit operable to make the common display driver decide which of the first display and the second display is to be used, wherein the folding portable communication unit is operable to permit verbal telephone communication only in a case that the first cabinet and the second cabinet are in an open position, wherein:

the control unit is operable to make the common display driver decide which of the first display and the second display to display input information depending on a kind of the input information, and wherein:

the control unit comprises a means for displaying the input information on the second display in accordance with an instruction of the user.

* * * * *